United States Patent [19]

Kuczenski et al.

[11] Patent Number: 4,754,732
[45] Date of Patent: Jul. 5, 1988

[54] LOW OIL SENSOR FOR AN INTERNAL COMBUSTION ENGINE

[75] Inventors: Steven R. Kuczenski; Robert H. DeBoth, both of New Holstein, Wis.

[73] Assignee: Tecumseh Products Company, Tecumseh, Mich.

[21] Appl. No.: 13,915

[22] Filed: Feb. 12, 1987

[51] Int. Cl.⁴ .............................................. F01M 1/00
[52] U.S. Cl. ...................... 123/196 S; 123/198 DC; 73/290 R; 340/618; 184/108
[58] Field of Search .................. 123/196 S, 198 DC; 73/290 R; 340/244 R, 618, 622; 184/108

[56] References Cited

U.S. PATENT DOCUMENTS

| | | | |
|---|---|---|---|
| 3,022,497 | 2/1962 | Tyner | 340/244 |
| 3,333,259 | 7/1967 | Carothers, Jr. | 340/244 |
| 3,366,100 | 1/1968 | Sapp | 183/198 DC |
| 3,577,121 | 5/1971 | Wing et al. | 340/59 |
| 3,593,267 | 7/1971 | Klein | 340/52 |
| 3,964,079 | 6/1976 | Katagiri et al. | 340/244 |
| 4,065,760 | 12/1977 | Feldon | 340/622 |
| 4,203,408 | 5/1980 | Yamaguchi et al. | 123/198 R |
| 4,204,203 | 5/1980 | Verne | 340/620 |
| 4,480,610 | 11/1984 | Stinson | 123/196 S |
| 4,583,085 | 4/1986 | Beller | 340/618 |
| 4,622,935 | 11/1986 | Janisch | 123/198 R |

FOREIGN PATENT DOCUMENTS 425379 9/1947 Italy .

OTHER PUBLICATIONS

Honda's Oil Alert System.

*Primary Examiner*—E. Rollins Cross
*Attorney, Agent, or Firm*—Jeffers, Hoffman & Niewyk

[57] ABSTRACT

A low oil sensor especially for application with an internal combustion engine is provided with an over-center spring and diaphragm structure to maintain the sensor in the inactivated mode whenever there is an adequate oil level in an engine sump. Crankcase pulse pressures provide an adequate pressure differential across the diaphragm to move the switch to activate an indicator circuit and to stop the engine. Inadvertent switch operation is prevented by utilization of a check valve and bleed port arrangement. The switch can be reset by an externally operable reset plunger.

31 Claims, 4 Drawing Sheets

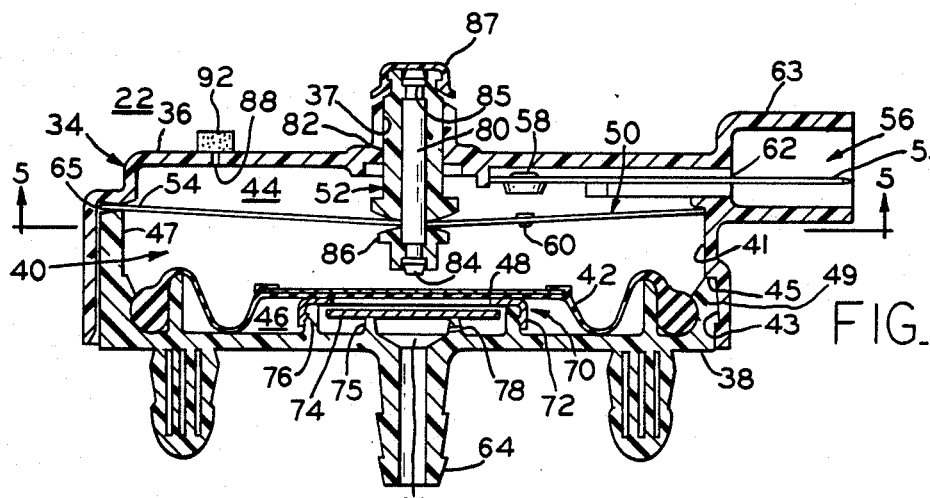
FIG_4A
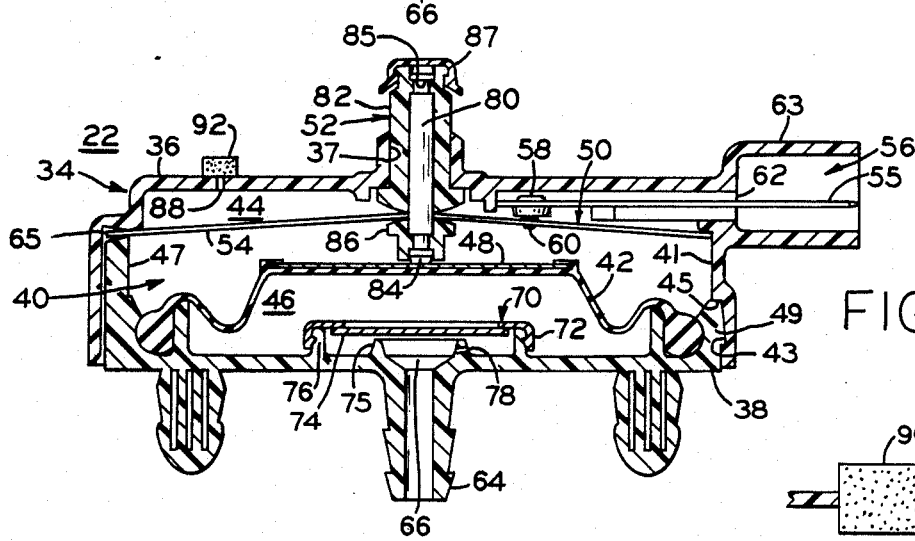
FIG_4B
FIG_4C
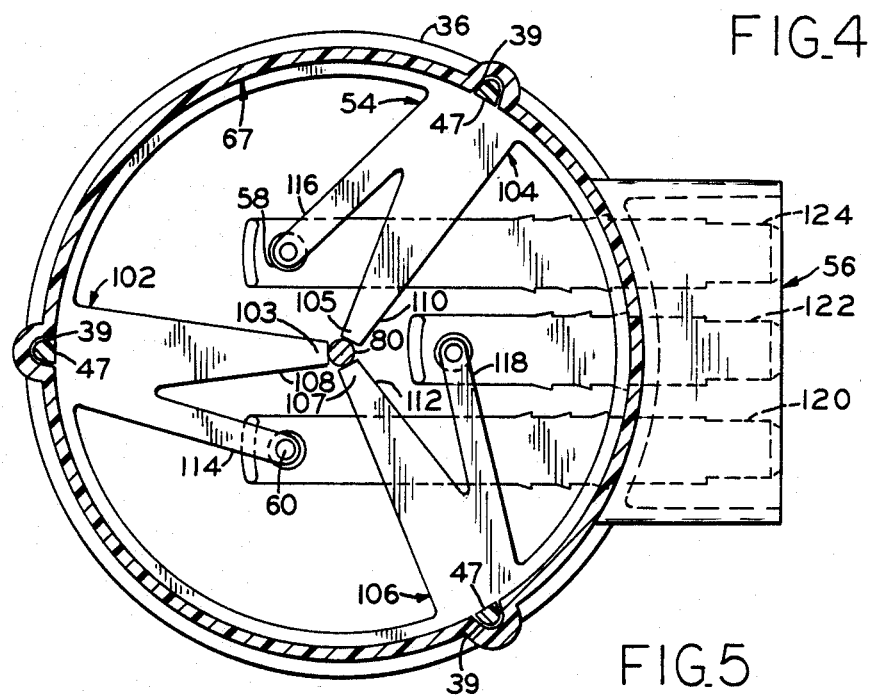
FIG.5

LOW OIL SENSOR FOR AN INTERNAL COMBUSTION ENGINE

BACKGROUND OF THE INVENTION

1. Field of the Invention

The present invention discloses a low oil sensor for use with internal combustion engines. More particularly, such an oil sensor finds application in small, four-cycle engines. A low oil level signal is sensed, generally in an oil sump, and communicated to a switch assembly coupled to an indicator circuit.

2. Prior Art

Oil level sensors are known in the art. However, they are characterized by cumbersome, difficult to assemble structures, which are susceptible to malfunction by failure of one or more of their complicated structural members. Further, the earlier apparatus are relatively insensitive to signal pressures, many do not provide positive disconnects, some are difficult to reset, and/or they are prohibitively expensive to manufacture.

U.S. Pat. No. 3,577,121—Wing discloses a brake fluid level switch assembly. The switch is illustrated in the open or reference condition with the fluid level in reservoir 34 in the figures. A low level oil condition is illustrated in reservoir 32 wherein diaphragm 60 has expanded allowing conductor switch 56 to contact housing 48 to close the contact circuit. An attendant is required to disassemble and reset the switch apparatus after the contact and circuit closure. The circuit in this particular disclosure has an electrically grounded cover 48 to energize signal light 78.

U.S. Pat. No. 3,964,079—Katagiri discloses a brake fluid reservoir with a fluid level indicator. The fluid reservoir is partitioned by a diaphragm into a liquid phase and a vapor phase portion with the diaphragm therebetween and movable in response to changes in the liquid level of the liquid phase portion. An operating rod is movably connected to the diaphragm and contacts a sensing means. The rod is movable to actuate the sensing means to open or close a circuit in response to movement of the diaphragm as a function of changes in the brake fluid level. The signal circuit may be either normally open or normally closed.

U.S. Pat. No. 3,333,259—Carothers, Jr., illustrates a vacuum operated oil level indicator. The indicator utilizes an indicator circuit with two series aligned switches. The first switch is manually closed by an operator to introduce a vacuum to control switch 24. Manual actuation of the first switch closes switch contacts 52, 54 and introduces a vacuum at a normal or adequate oil level to switch 24 which open contacts 44, 46 of the second switch. The second switch maintains indicator lamp 68 in a non-indicating mode. Inadequate oil in the oil reservoir communicates air to the vacuum reservoir maintaining diaphragm operator 40 in its reference mode with contacts 44, 46 closed. The air dissipates the vacuum, thus moving diaphragm 24 and closing the circuit to actuate indicator lamp 68.

U.S. Pat. No. 3,022,497—Tyner teaches a variable orifice dipstick assembly in cooperation with a signal circuit which is responsive to a low level liquid in a sump or reservoir. The device is particularly taught for use in an automobile engine with the dipstick inserted into the oil sump. The assembly includes a diaphragm actuator and a guide member in a housing. The diaphragm operator separates the cavity of the housing into two distinct chambers. Contacts are provided that are spring-biased and diaphragm-operable or responsive to close a circuit contact. The housing serves as a ground member within the electric circuit and must be insulated from at least the contact means extending through the housing assembly. In operation, manifold vacuum from the engine is communicated to a first chamber on one side of the diaphragm and atmosphere is provided to the second chamber on the opposite side of said diaphragm. A plunger-like apparatus and valve assembly extends through the housing and diaphragm to contact a spade plug externally of the housing and is also movable with a valve guide of the diaphragm operator. This assembly includes two biasing springs, one biases the diaphragm operator assembly and the second spring biases a pin with a valve head attached thereto and operable through the diaphragm operator. As described, the dipstick at full or adequate oil level provides a stop for communication of atmosphere or crankcase pressure to the first chamber, which is connected to manifold vacuum. At low oil levels, atmosphere (crankcase pressure) is communicated to the first chamber and reduces the vacuum. The diaphragm operator is biased to close the circuit thereby energizing a signal lamp through the network of pins and contacts within the housing.

A low oil sensor known in the art, is coupled to the oil sump of an internal combustion engine and is operable in response to a crankcase pressure signal to move a reset switch. The sensor and switch are a spring-biased diaphragm operated mechanism. The over-center spring and reset switch are displaced from the diaphragm and switch cavity.

Although it is known to utilize oil or fluid sensors in internal combustion engines, the known apparatus generally provide variable or fixed-rate springs and diaphragms with connecting rod-type apparatus to close circuits or short circuit operating means to prevent engine damage.

SUMMARY OF THE INVENTION

The present invention discloses a fluid level sensor coupled to an internal combustion engine crankcase and having a diaphragm biased by a reference pressure. The sensor is operable at a predetermined crankcase pressure signal to engage and move a switch means against an interference-fit flexible arrangement to activate a signal circuit. The switch means is baised by an over-center, spring device with an interference fit, which arrangement permits utilization of a sensitive switch means in an environment that includes high frequency vibration and sudden, high magnitude mechanical jolts. This switch responds to a detected low-pressure signal in a crankcase above a predetermined value. The interference-fit, actuator-switch means coupled with a calibrated check valve and a properly sized diaphragm produce a control valve very sensitive to low pressure signals that is inexpensive, easily assembled, relatively insensitive to vibration and dirt, and which may be reset with only the push of a button.

BRIEF DESCRIPTION OF THE DRAWING

In the figures of the drawings, like reference numerals identify like components;

FIG. 4a is a cross-sectional elevation of the sensor in a reference position;

FIG. 4b is a cross-sectional elevation of the sensor of FIG. 4a in the closed circuit indicating position;

FIG. 4c is a cross-sectional elevation of a pressed powder insert for use as a restriction;

FIG. 5 is a plan view of the switch fingers of the oil level sensor of FIGS. 4a and 4b;

DETAILED DESCRIPTION OF THE INVENTION

Figure 1:
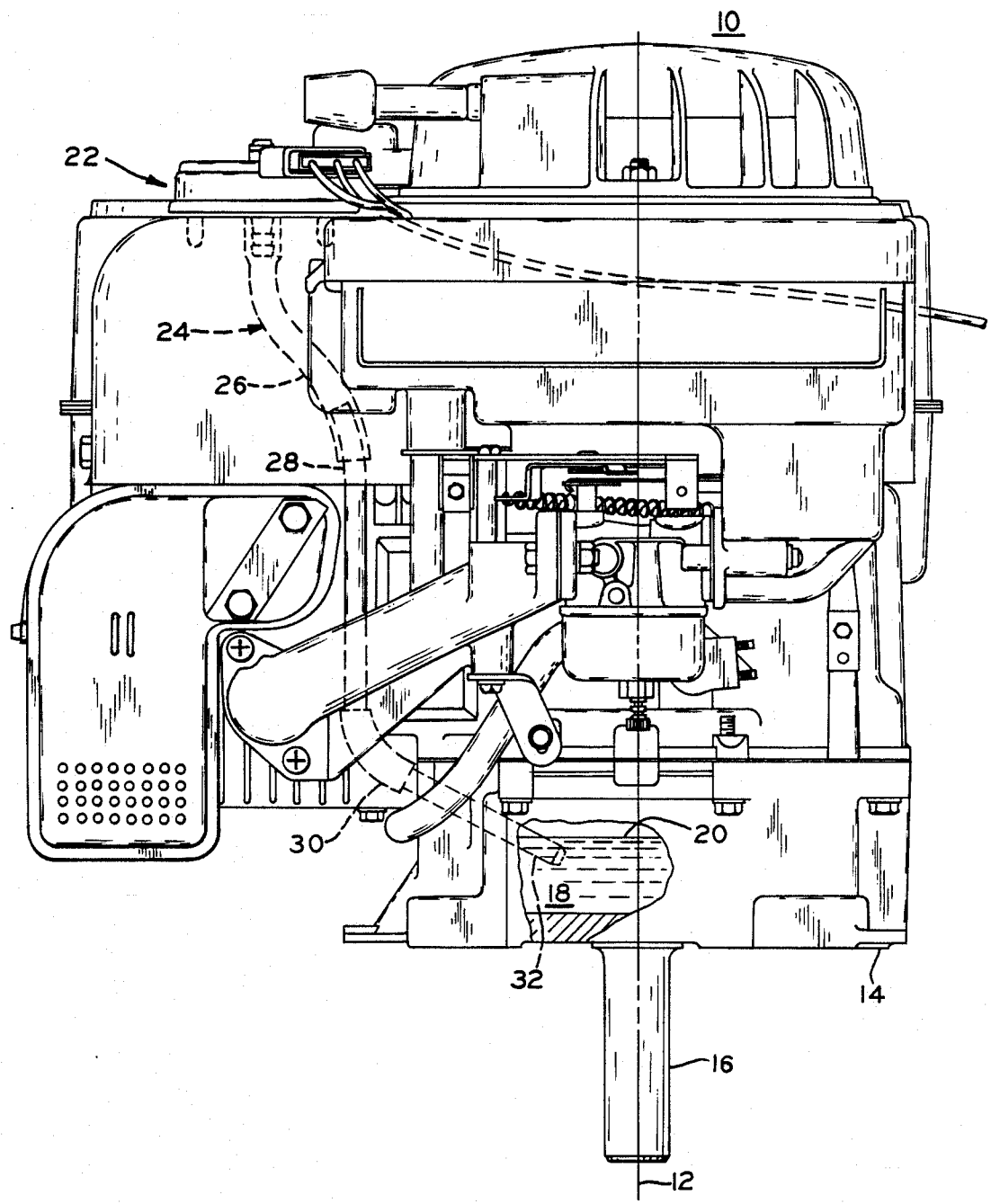
FIG. 1 is an elevational view of an internal combustion engine with the oil sensor and a conduit communicating to the engine crankcase.
Figure 2:
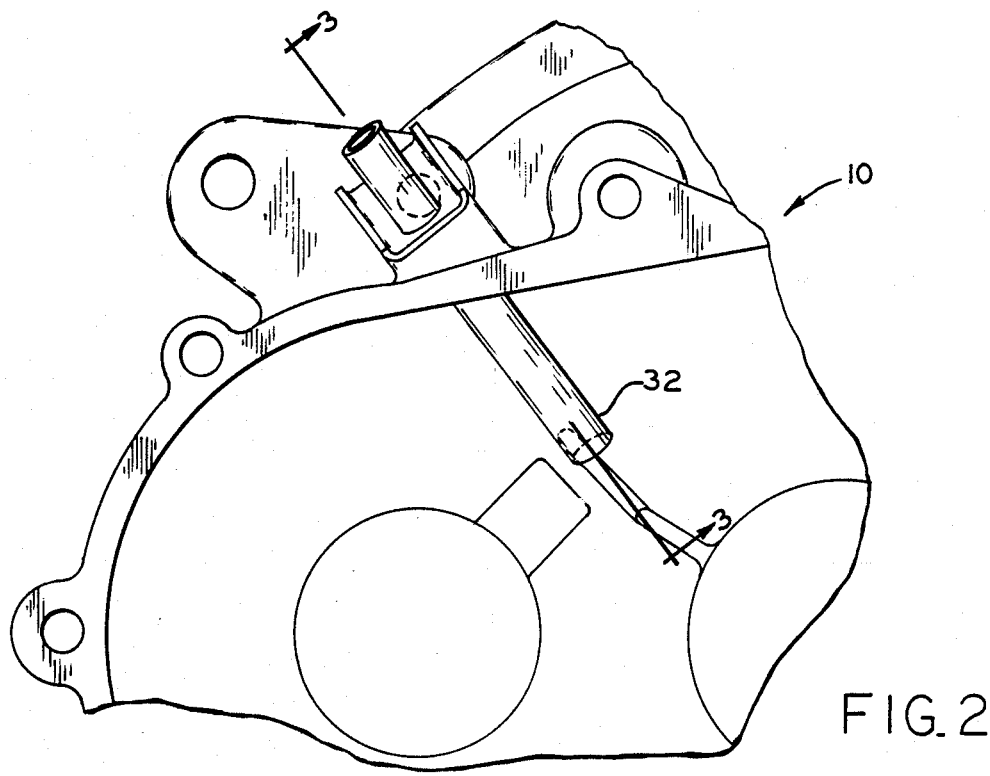
FIG. 2 is a plan view of a tube extension from the crankcase to an external conduit.
Figure 3:
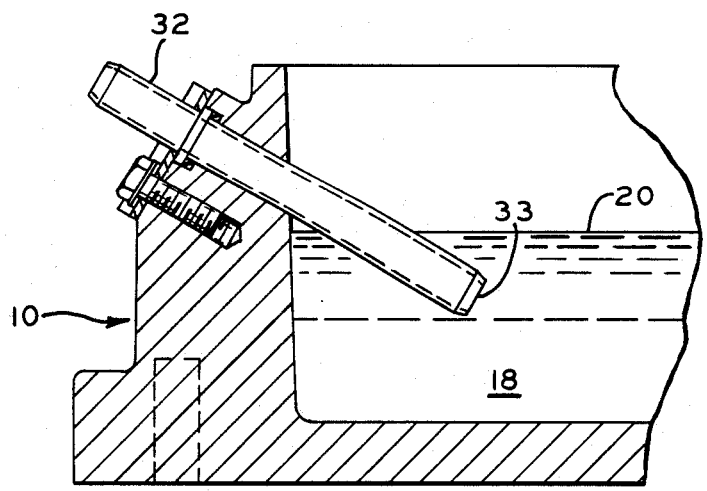
FIG. 3 is a cross-sectional view of the tube of FIG. 2 as taken along line 3—3.

FIG. 1 illustrates an internal combustion engine 10 in an elevational view having a vertical axis 12, a bottom portion 14, a drive shaft 16 protruding from bottom portion 14 along axis 12 and a crankcase, oil reservoir or sump 18 with oil at a reference level 20. An oil level sensor 22 is mounted on engine 10 and communicates with sump 18 through a conduit 24. Conduit 24 may be of any material commonly utilized for connecting hoses in engine environments, such as neoprene or nylon. As shown in FIG. 1, conduit 24 includes a flexible material portion 26, a metallic section 28, a flexible coupling 30 and a metal tube 32 extending into the oil bath in crankcase 18. Tube 32 is shown in FIGS. 2 and 3 in plan view and in cross-section. This preferred embodiment with tube 32 of a connecting means is utilized to demonstrate a secure member not subject to relative or random movement thereby securing a constant oil level reference point for fluid pressure signal (crankcase pulses) communication to oil level sensor 22. The reciprocating pistons of engine 10 produce the crankcase pulses which are especially noticeable in an engine with an odd number of pistons not shown, but known in the art.

Oil level sensor 22, for example, is illustrated in FIGS. 4a, 4b and FIG. 5 in cross-section. Sensor 22 includes a housing 34 having a top segment 36 with slots 39, a first wall annulus 41, a second wall annulus 43 and a shoulder 45 at their junction; and, a lower segment 38 with posts 47 and annular segment 49. Posts 47 are matable with slots 39 and annular segment 49 contacts shoulder 45 when upper segment 36 and lower segment 38 are coupled. Segments 36 and 38 may be secured by means known in the art such as rivets, glue or, as illustrated in FIGS. 4a and 4b with snap fits. Segments 36 and 38 cooperate to define cavity 40 with a diaphragm 42 secured in cavity 40 and retained on lower segment 38. Diaphragm operator 42 cooperates with housing 34 to define a first or reference chamber 44 and a second or actuation chamber 46. Diaphragm operator 42 includes a plate 48 secured thereon.

Switch means 50 in cavity 44 is a thin structure which includes a switch actuation means 52, an over-center spring actuation device 54 with movable second contact points 60, and arms 55 with fixed first contact pads or points 58 matable with second contact points 60 of spring apparatus 54. Arms 55 extend through contact arm ports 62 defined by upper portion 36 of housing 34, which housing 34 also defines a receptacle 63 matable with a contacting element, as known in the art, but not shown herein. Housing 34 is relatively thin and may be of an insulating or electrically non-conductive material.

Lower portion 38 has a fluid sensing port 66 with a protuberance 64 extending therefrom for a coupling or conduit 24. Protuberance 64 provides a communication between conduit means 24 through port 66 and second chamber 46, which is sealed by diaphragm operator 42 from first chamber 44.

Figure 6:
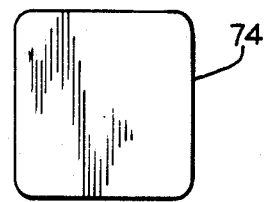
FIG. 6 is illustrative of a configuration for a check valve utilized in the oil sensor.
Figure 7:
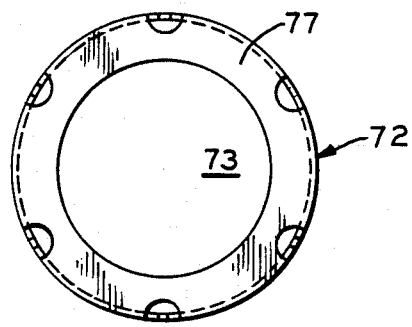
FIG. 7 is a plan view of the check valve retainer of the oil sensor.

A check valve 70, shown in FIGS. 4a and 4b, is positioned in chamber 46 to seal port 66. Check valve 70 includes a retainer 72, a calibrated valve plate 74, a valve seat 75 positioned about port 66 for seating valve plate 74, and a mounting bracket 76 illustrated as an annulus to secure retaining means 72. A bleed port or restriction 78 is provided in valve seat 75 for continuous communication between port 66 and chamber 46. Restriction 78 allows dissipation of excess pressure in chamber 46 after seating of valve plate 74. Valve plate 74, shown in a plan view in FIG. 6 as a generally square or rectangular shaped valve, is calibrated and gravity-biased to respond to a specific fluid pressure communicated from crankcase 18 when the oil level is below tube mouth 33 of tube 32. FIG. 7 illustrates check valve retainer 72 in plan view as an annular segment defining port or passage 73, thus, for communication between chamber 46 and passage or port 66.

Switch actuator 52 includes a pin 80 with a lower portion 84 and an upper portion 85. Pin or plunger 80 is secured in a slidable upper collar 82 by a lower collar 86 at its lower portion 84. Spring actuator or flexural arm arrangement 54 with tabs 65 and an outer annulus 67 is mounted at its outer radius between upper and lower housing segments 36 and 38. Tabs 65 extend radially outward from annulus 67 and rest on posts 47 in recesses 39. The tabs 65 locate spring actuator 54 in chamber 44 and maintain it against rotational motion. Pin 80 and collar 82 extend from first chamber 44 through a bore or actuator port 37 defined by top segment 36, and are slidable in bore 37 between a first and second position. Positioned on pin 80 and collar 82 at upper portion 85 is a protective cap 87. At switch 50 second position (shown in FIG. 4b), cap 87 may be utilzied to move pin 80 and collars 82, 86 to their first position thus resetting switch means 50. Pin 80 and collars 82 and 86 are calibrated with spring actuator 54 to be operable by diaphragm operator 42 at a predetermined pressure indicative of a low-oil level in crankcase 18.

Figure 8:
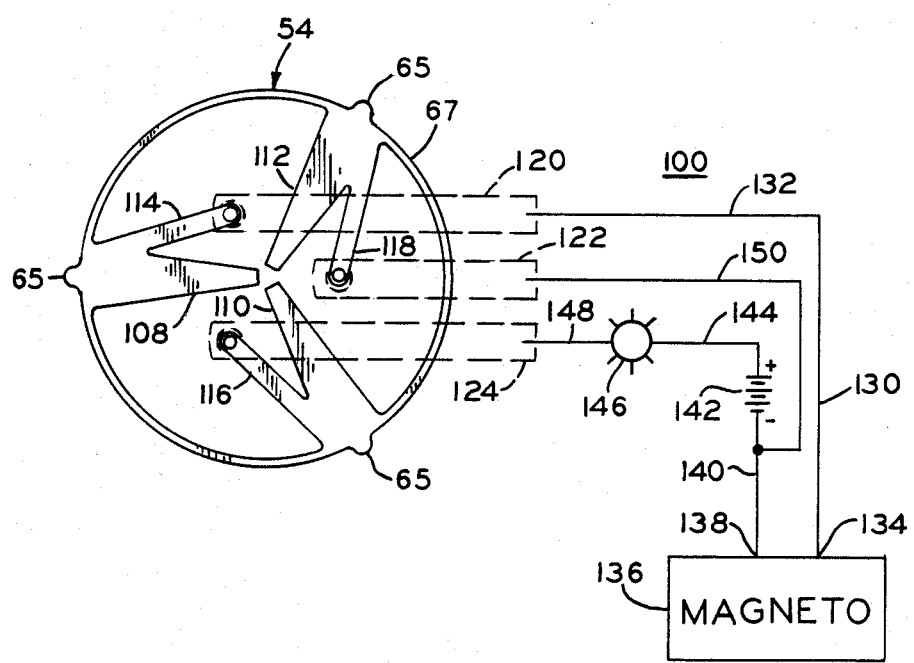
FIG. 8 is a schematic of an indicating circuit.

Spring 54, shown in FIGS. 5 and 8 in plan view with a generally annular outer annulus 67, cooperates with extending arms 55 illustrated as spade plugs for coupling with an external indicating circuit 100. Spring 54 is a flexible, electrically conductive material and has a set of three V-shaped arms 102, 104 and 106 extending centrally from wall 67 with a first leg of each V in proximity at end points 103, 105, 107, respectively, to pin 80 which end points are operatively secured between upper collar 82 and lower collar 86, but not fixed to pin 80. These first legs are noted as elements 108, 110 and 112, respectively. The second or contact carrying leg of each V arm are noted as elements 114, 116 and 118, respectively. The first and second legs of the V-shaped arms or fingers move in unison from the first to the second switch position. Arms 108, 110 and 112 touch pin 80 at end points 103, 105 and 107, to form a generally triangular shaped arrangement about pin 80. Spade plugs or extending arms 55 are noted as elements 120, 122 and 124 extending from arms 102, 106, and 104, respectively, however, the relative order of the plugs 55 is not a limitation. Similarly the V-shape of arms 102, 104 and 106 of actuator means 54 is utilized for illustration not as a limitation.

Spring actuator 54 is an over-center arrangement, which is positioned about and contacts pin 80. As shown in FIGS. 4a and 4b the spring always contacts or is in proximity to pin 80 even though the first and second positions are displaced from the horizontal centerline. As spring 54 transfers or moves between the first and second positions of switch means 50, a known or predetermined force is required to overcome the interference fit and flexural strength of spring means 54. As the plunger 80 and spring arms 108, 110 and 112 move from the first to the second switch position the annulus 67 and tabs 65 expand to accommodate the interference fit as the spring arms pass through the horizontal plane defined by the tops of posts 47 or annular wall 67. The force required to move diaphragm 42, pin 80 with collars 82 and 86 and to flex elements 108, 110 and 112 is calculated to correspond to the pressure differential across diaphragm 42 between the reference pressure and the crankcase pulse pressure above the oil bath, which is generally a very low, positive pressure. However, the calibrated force is adequate to prevent false triggering of the swtich by mechanical shocks.

Spring 54 of switch means 50, as shown in FIG. 8 is coupled to an illustrative indicating circuit 100. In the switch reference or first position, as shown in FIG. 4a, second contact points 60 of V-shaped arms 102, 104 and 106 are disengaged from first contact points 58 which opens circuit 100. However, in the second or actuated position of FIG. 4b, all contact points 58 and 60 are engaged and circuit 100 is closed or energized. Connecting means or output spade plug 120 is coupled by lines 130 and 132 to an ignition ground 134 of a magneto 136 of an engine, such as engine 10. Magneto or engine ignition circuit 136 has a second input 138 with a line 140 coupled to an energy source 142, which energy source 142 has a second line 144 coupled to an indicator means 146. Indicator means 146 is coupled to connecting means 124 by conductor 148. Indicator 146 may be a lamp, an acoustic signal or a mechanical device. Lug or connector 122 is coupled to ground by conductor 15. Circuit 100 is operable to disable or kill the engine without indicator 146 and energy source 142.

A passage 88 in FIG. 4b is defined by upper portion 36 and provides communication between a source of reference pressure, atmosphere in this case, a first chamber 44. This passage may be a small, narrow restriction, or it may be a larger restriction containing a pressed powder restrictor 90 as known in the art and shown in FIG. 4c as element 90. A filter 92 mounted on housing 34 at port 88 minimizes communication of entrained material to chamber 44. Passage 88, filter 92 and restrictor 90 are shown for illustration purposes only, which passages may be provided in the housing at other locations. Alternatively, chamber 44 may be sealed at a known pressure.

Engine 10, which is illustrated and operable in a vertical orientation, has a sump 18 at its lower level 14. Sump 18 includes an oil bath, which at a normal or reference level 20 submerges tube mouth 33 of tube 32 to seal pneumatic communication between crankcase 18 and oil sensor 22. During normal operation, oil sensor switch actuator 50, as illustrated in FIG. 4a, is in its reference or first position with first contacts 58 and second contacts 60 disengaged, thereby maintaining indicating circuit 100 in an open condition and allowing magneto 136 in a parallel circuit to remain in an open or operating position. If the oil level in sump 18 falls below tube mouth 33, as shown by the dashed line in FIG. 3, the crankcase pneumatic pulse pressure is communicated to oil level sensor 22 through conduit 24 and port 66. Check valve 74 is biased by gravity to a position on seat 75 to seal port 66 when the oil level in sump 18 covers tube mouth 33. Check valve 74 is calibrated and operable to open at a crankcase pressure correlative to the engine pneumatic pulse produced in crankcase 18, which pulses are correlative to engine revolutions. Check valve 74 operable with a periodicity related to the engine pulse opens communication between crankcase 18 and chamber 46. As the crankcase pulse pressure varies with the engine pulse the pressure change communicated to chamber 46 likewise varies with the pulsing action as valve 74 oscillates between an open and closed position until the pressure in chamber 46 is equal to the crankcase pulse pressure.

A predetermined pressure differential between first chamber 44 and second chamber 46, which is a function of the crankcase pulse pressure, provides a force adequate to move diaphragm 42 and plate 48 to engage and move pin 80 against their own weight. In addition, this force is adequate to move or deform over-center spring means 54 through its interference fit with pin 80, and thereby snapping or moving pin 80 to its second position to close switch means 50. As the interference fit of spring 54 as well as the biasing weight of pin 80 and valve 74, must be overcome before switch 50 is closed, an indiscriminate or inadvertent single pulse of crankcase pneumatic pressure would not move diaphragm 42. Further, a single inadvertent pneumatic pulse would bleed back to crankcase 18 through bleed port 78. Plate 48 contacts and moves pin 80 and spring actuation means 54 from the first or reference position to its second, closed or actuating position as shown in FIGS. 1, 4a and 4b. In this actuating position, contacts 60 and 58 are engaged and circuit 100 is closed. At switch means 50 second position circuit 100 is closed and the circuit of indicating means 146 is closed and energized. Also, at the second position the magneto 136 circuit is grounded through lugs 120 and 122; lines 132, 130 and 150; and, mating contacts 58 and 60 to kill the engine.

While only particular embodiments of the present invention have been shown and described, it is manifested that these are in no way limiting on the scope of the invention described and claimed herein.

We claim:

1. A fluid level sensor connected to the crankcase of an internal combustion engine, said sensor comprising;
   a housing defining a cavity,
   a diaphragm operator secured in said cavity and cooperating with said housing to define a first chamber and a second chamber;
   said first chamber at a reference pressure,
   switch means for actuating a circuit mounted in said first chamber and operable between a first position and a second position,
   said switch means having actuator means for moving said switch means, said actuator means being operable by said diaphragm;
   an over-center spring means for maintaining said switch means selectively at one of said first and second positions;
   said housing defining a fluid sensing port coupled to said engine crankcase to communicate fluid pressure between said second chamber and said engine crankcase;

said diaphragm operator operable to engage and move said actuator and switch means to one of said first and second positions in response to a pressure differential between said first chamber and said second chamber above a predetermined level, said spring means holding said actuator and switch means in the said one position.

2. A fluid level sensor as claimed in claim 1 wherein said reference pressure is the atmospheric pressure.

3. A fluid level sensor as claimed in claim 1 wherein said crankcase fluid pressure communicating to said second chamber is the vapor column in said crankcase of an internal combustion engine.

4. A fluid level sensor as claimed in claim 1 wherein said switch means is coupled to an indicating circuit.

5. A fluid level sensor as claimed in claim 4 wherein said indicating circuit is coupled to a source of electrical energy and is responsive to a signal at said switch means.

6. A fluid level sensor as claimed in claim 1 wherein said actuator means includes a pin extending through said housing, said pin operable by said diaphragm operator to move said switch means between said first and second positions, and said over-center spring means engaging said pin.

7. A fluid level sensor as claimed in claim 1 wherein said spring means has fingers extending into close proximity with said actuator means.

8. A fluid level sensor as claimed in claim 7 wherein said fingers contact said actuator means.

9. A fluid level sensor as claimed in claim 7 wherein said spring means has at least three fingers into close proximity with said actuator means and configured to generally define a triangle about said actuator means.

10. A fluid level sensor as claimed in claim 1 wherein said spring means has an outer annulus with fingers extending centrally therefrom into proximity with said actuator means.

11. A fluid level sensor as claimed in claim 10 wherein said outer annulus defines a plane and wherein said fingers contact said actuator means at said switch first and second positions displaced from said plane.

12. A fluid level sensor as claimed in claim 10 wherein said housing includes an upper segment and a lower segment;
said upper segment defining at least one slot;
said lower segment defining at least one post, said posts being matable with said slots;
said spring actuator, annular outer wall having tabs extending radially therefrom, said tabs being seated on said posts in said slots;
said annular outer wall and tabs being expansible to accommodate an interference fit between said actuator means and said fingers as said switch means moves between said first and second positions.

13. A fluid level sensor as claimed in claim 7 wherein said fingers are electrically conductive and said switch means are carried by said fingers.

14. A fluid level sensor for sensing an internal combustion engine oil level, said sensor comprising:
a housing defining a cavity and a fluid sensing port;
a diaphragm operator mounted in said housing and cooperating therewith to define a first chamber at a reference pressure, and a second chamber, said second chamber connected to said fluid sensing port,
said engine having at least one piston and an oil reservoir with liquid oil at a reference level and subject to engine pulse pressure from a reciprocating piston above said liquid oil;
conduit means coupled to said fluid sensing port and communicating between said oil reservoir and said second chamber;
a switch means for actuating a circuit, said switch means mounted in said first chamber and operable between a first position and a second position;
an actuator means positioned in said first chamber and operable to move said switch means,
an over-center spring means positioned in said first chamber for maintaining said switch means at one of said first and second positions;
said diaphragm operator operable in response to a pressure differential between said first and second chamber to engage and move said actuator means, said spring means and said switch means to said second position thereby actuating a responsive circuit to energize an indicator or disable the engine.

15. A fluid level sensor as claimed in claim 14 including an indicator circuit and a parallel circuit coupled to an engine ignition circuit.

16. A fluid level sensor as claimed in claim 14, wherein said reference pressure is atmospheric pressure and said second chamber communicates wtih engine pressures in said oil reservoir below a predetermined oil level to provide a pressure differential across said diaphragm operator.

17. A fluid level sensor as claimed in claim 14, further comprising a check valve means between said oil reservoir and said second chabmer.

18. A fluid level sensor as claimed in claim 17 wherein said check valve has a valve seat, a valve member and a retention means.

19. A fluid level sensor as claimed in claim 17 wherein said valve seat includes a restricted bleed passage communicating between said second chamber and said conduit means.

20. A fluid level sensor as claimed in claim 19 wherein said indicating circuit includes parallel circuits coupled to said switch means and an engine ignition circuit,
said switch means operable to close said indicating circuit to energize said indicator means and disable said engine.

21. A fluid level sensor for an internal combustion engine as claimed in claim 14 wherein said spring actuator means includes fingers contacting said actuator means and configured to generally define a triangular arrangement thereabout, which actuator fingers define an over-center structure.

22. A fluid level sensor for an internal combustion engine as claimed in claim 21 wherein said switch means include contact arms with first contact pads and said spring actuator fingers include second contact pads for selectively engaging said first contact pads.

23. A fluid level sensor as claimed in claim 18 wherein said check valve is calibrated to open above a predetermined crankcase pressure.

24. A fluid level sensor for an internal combustion engine as claimed in claim 14 wherein said housing includes an external port,
said actuator means extending from said first chamber through said external port and operable to reset said switch means.

25. A fluid level sensor for an internal combustion engine as claimed in claim 21 wherein said housing defines an external port;

said actuator means is a pin extending from said first chamber through said external port;

said spring actuator means includes an outer annulus wall defining a plane;

said spring actuator fingers centrally extending from said annulus to contact said pin means at said first position displaced from said plane, said fingers defining a generally triangular arrangement about said pin, and said pin is externally movable to reset said switch to said first position.

26. A fluid level sensor as claimed in claim 25 wherein said spring actuator fingers and outer annulus are a flexible material which is electrically conductive.

27. A fluid level sensor as claimed in claim 14 wherein said housing includes an upper segment and a lower segment;

said upper segment defining at least one slot;

said lower segment defining at least one post matable with said upper segment slots;

said spring actuator means having an outer annulus with at least one tab extending radially therefrom, which tabs are seated on said lower segment posts in said slots to locate and maintain said spring actuator in said housing against rotation therein;

said outer wall and tabs are expansible to accommodate an interference fit between said actuator means and said fingers as said switch means moves between said first and second positions.

28. A fluid level sensor as claimed in claim 27 wherein said housing is electrically non-conductive.

29. A fluid level sensor as claimed in claim 14 wherein said engine has an odd-number of reciprocating pistons.

30. A fluid level sensor for an internal combustion engine as claimed in claim 14 wherein said housing, said switch means, said actuator means and said diaphragm are generally planar-like elements assembled in a stacked relationship to define a relatively thin sensor assembly.

31. A fluid level sensor as claimed in claim 1 wherein said switch means is coupled to an electrical circuit which circuit is operable to disable the engine.

* * * * *

UNITED STATES PATENT AND TRADEMARK OFFICE
CERTIFICATE OF CORRECTION

PATENT NO. : 4,754,732

DATED : July 5, 1988

INVENTOR(S) : Steven R. Kuczenski et al

It is certified that error appears in the above-identified patent and that said Letters Patent is hereby corrected as shown below:

```
Col. 5, line 48, change "a" to --and--;
Claim 3, Col. 7, line 14, change "column" to --volume--;
Claim 16, Col. 8, line 29, change "wtih" to --with--;
Claim 17, Col. 8, line 35, change "chabmer" to --chamber--.
```

Signed and Sealed this

Thirteenth Day of December, 1988

Attest:

DONALD J. QUIGG

*Attesting Officer*    *Commissioner of Patents and Trademarks*